US012753686B1

(12) United States Patent
Al Abdulgader et al.

(10) Patent No.: US 12,753,686 B1
(45) Date of Patent: Oct. 6, 2026

(54) PRODUCED WATER DEGASSING USING EJECTOR

(71) Applicant: Saudi Arabian Oil Company, Dhahran (SA)

(72) Inventors: Hasan Al Abdulgader, Dammam (SA); Duaa J. Al Saeed, Al Qatif (SA); Abdullah F. Al Mulla, Al Khubar (SA); Mahdi A. Aldajani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/385,450

(22) Filed: Nov. 11, 2025

(51) Int. Cl.
*E21B 43/40* (2006.01)
*B01D 19/00* (2006.01)
*E21B 43/16* (2006.01)

(52) U.S. Cl.
CPC .......... *E21B 43/40* (2013.01); *B01D 19/0068* (2013.01); *B01D 19/0073* (2013.01); *E21B 43/166* (2013.01); *B01D 2221/04* (2013.01); *B01D 2257/304* (2013.01); *B01D 2257/504* (2013.01); *B01D 2257/702* (2013.01)

(58) Field of Classification Search
CPC ........................................................ E21B 43/04
See application file for complete search history.

(56) References Cited

U.S. PATENT DOCUMENTS 4,171,016 A * 10/1979 Kempton .............. E21B 43/124
417/172
2018/0266229 A1* 9/2018 Fredheim ................ E21B 43/01

FOREIGN PATENT DOCUMENTS

WO WO 2002100510 A1 12/2002
WO WO 2017080950 A1 5/2017

OTHER PUBLICATIONS

Khaghani et al., “Sustainable removal of non-condensable gases from geothermal waters,” Renewable and Sustainable Energy Reviews, May 2013, 21:204-214.
veoliawatertech.com [online], “CoStrip A Robust Degasification Solution,” Available on or before Nov. 7, 2024, via Internet Archive: Wayback Machine URL <https://web.archive.org/web/20241107062815/https://www.veoliawatertech.com/sites/g/files/dvc3601/files/document/2020/06/CoStrip.pdf>, retrieved on May 18, 2026, URL <https://www.veoliawatertech.com/sites/g/files/dvc3601/files/document/2020/06/CoStrip.pdf>, 4 pages.

* cited by examiner

*Primary Examiner* — William D Hutton, Jr.
*Assistant Examiner* — Avi T Skaist
(74) *Attorney, Agent, or Firm* — Fish & Richardson P.C.

(57) ABSTRACT

A method of treating a produced water (PW) stream. The method includes splitting a PW stream that contains a dissolved gas into a first stream and a second stream. The method further includes compressing the first stream, followed by sending at least a portion of the first stream to an ejector as a motive fluid to create a suction. The method further includes sending the second stream to a degassing vessel fluidically connected to the ejector, where the suction lowers an internal pressure of the degassing vessel, and at least a portion of the dissolved gas is released from the second stream as an off-gas. The method further includes mixing the motive fluid and the off-gas in the ejector, forming a two-phase stream.

20 Claims, 4 Drawing Sheets

PRODUCED WATER DEGASSING USING EJECTOR

TECHNICAL FIELD

This disclosure relates to degassing of water using an ejector.

BACKGROUND

Produced water (PW), the largest by-product of oil and gas production, is brought to the surface during hydrocarbon recovery and contains a mixture of salts, hydrocarbons, suspended solids, heavy metals, and other contaminants. The complexity of its composition makes it challenging to treat. Generally, PW can be separated from crude oil and gas in gas-oil separation plants (GOSP). The PW can contain various dissolved gas such as methane, carbon dioxide ($CO_2$), and hydrogen sulfide ($H_2S$), and these gases can pose safety and environmental hazards due to their toxicity, flammability, and potential for corrosion. Therefore, degassing is a key first step in PW treatment. Degassing of a solution generally involves processes that reduce gas solubility or promote gas transfer from the liquid phase, such as pressure reduction, thermal or vacuum methods, membrane systems, chemical scavengers, or stripping techniques. Effective removal of these gases ensures safer handling, protects downstream equipment, and improves overall treatment efficiency.

SUMMARY

This disclosure describes technologies relating to a novel process for removing dissolved gases from PW by integrating an ejector and a degassing vessel upstream of other wastewater treatment systems such as filtration. In this concept, PW itself is utilized in two roles: as the wastewater requiring degassing and as the high-pressure motive fluid to drive the ejector for degassing. A splitter can receive the incoming PW stream from a GOSP and divide it into two streams. The first PW stream can be compressed to a high pressure, e.g., above 2,000 psi (13.8 MPa), and directed to the ejector as the motive fluid, creating a vacuum or near-vacuum condition inside the degassing vessel. The other PW stream can enter the degassing vessel where the vacuum promotes the release of dissolved gases. The released off-gas is entrained by the motive fluid in the ejector. In some implementations, this mixed stream can be returned to the GOSP, enabling gas recovery and eliminating waste discharge from the ejector. This integrated approach minimizes additional treatment equipment requirements, reduces treatment costs, and supports circular processing within existing infrastructure.

DETAILED DESCRIPTION

Figure 1:
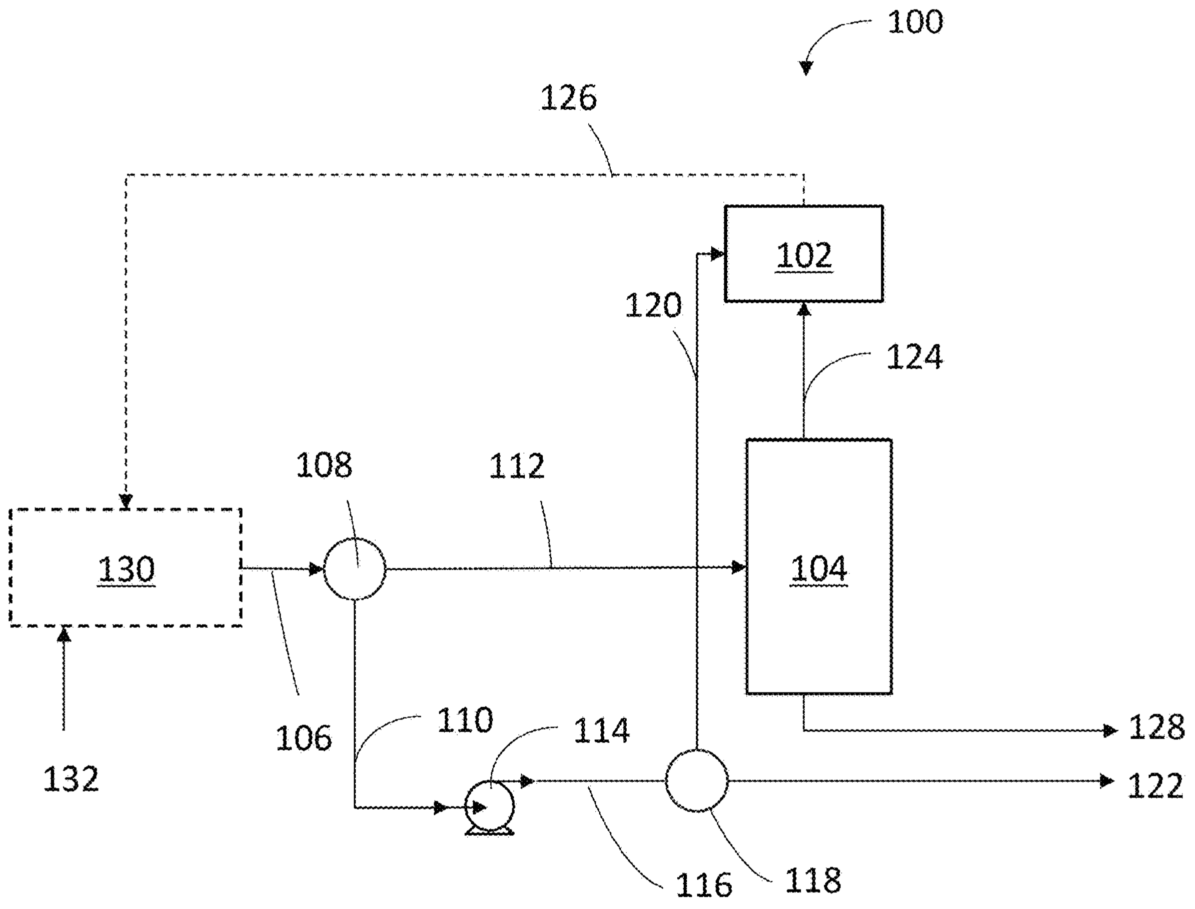
FIG. 1 is a schematic illustration of a produced water (PW) degassing system using an ejector.

Implementations described herein provide a method of removing dissolved gases from PW by integrating an ejector and a degassing vessel upstream, improving the wastewater treatment processes in oil and gas production facilities. Generally, PW requires extensive treatment due to its complex composition of contaminants such as oil, solids, salts, and dissolved gases. In particular, dissolved gases such as C1-C5 hydrocarbons, $CO_2$, and $H_2S$ can pose significant environmental and safety challenges and interfere with downstream treatment processes. To address this issues, a novel degassing process that can be implemented after a GOSP and prior to subsequent wastewater treatment processes such as filtration and desalination is proposed. Various implementations of this disclosure integrate a liquid ejector and a vertical degassing vessel upstream of any filtration or desalination step. In this approach, high-pressure produced water is split into two streams: one serves as the motive fluid to create a vacuum in the degassing vessel, while the other is treated under this low-pressure condition to release dissolved gases. The off-gas that contains C1-C5 hydrocarbons, $CO_2$, $H_2S$, or their combinations, is entrained by the motive stream and discharged from the ejector as a discharge stream. In some implementations, this discharge stream can be returned to the GOSP that treats the PW, enabling gas recovery and eliminating waste discharge. Compared to conventional methods, this process simplifies downstream treatment, reduces corrosion risks, lowers operational costs, and enhances safety without requiring additional energy-intensive equipment.

In the following, the methods and systems of removing dissolved gases from PW are described referring to FIGS. 1-2. Example process flows are described referring to FIGS. 3-4.

In this disclosure, the term “produced water (PW)” refers to a water-based stream that is brought to the surface during oil and gas extraction from underground reservoirs. PW can be generated in large volumes and typically contains various contaminants such as salts, hydrocarbons, and heavy metals, among others. PW is considered a significant industrial waste stream and is targeted in various implementations for treatment and reuse, particularly as a potential source of treated water for reservoir injection.

In this disclosure, the term “C1-C5 hydrocarbon(s)” refers to hydrocarbons containing between one and five carbon atoms per molecule. The letter ‘C’ denotes carbon, and the number indicates the count of carbon atoms in the molecule. This classification does not depend on whether the hydrocarbons are saturated (alkanes) or unsaturated (alkenes, alkynes). C1-C5 can refer to a single hydrocarbon species, e.g., methane for C1, or a mixture of hydrocarbons within that carbon range.

Further, the term ‘ejector’ is used in a broad sense to describe a device that utilizes a high-velocity motive fluid to entrain and transport a secondary fluid such as an off-gas from a solution, typically through momentum transfer and pressure reduction. This term can also be referred to by synonyms commonly used in industry, including ‘jet pump,’ ‘liquid jet ejector,’ ‘vacuum ejector,’ or ‘venturi ejector.’ While these devices can vary in design and application, they share the fundamental principle of using a motive fluid to create suction and induce flow of another fluid.

An acronym “BTEX” is used to refer to any one or combination of benzene, toluene, ethylbenzene, and xylenes, which are aromatic hydrocarbons commonly found in petroleum products and industrial solvents. BTEX are volatile, toxic, and often present in PW, groundwater contamination, and air emissions from oil and gas operations.

Degassing of Produced Water

Figure 2:
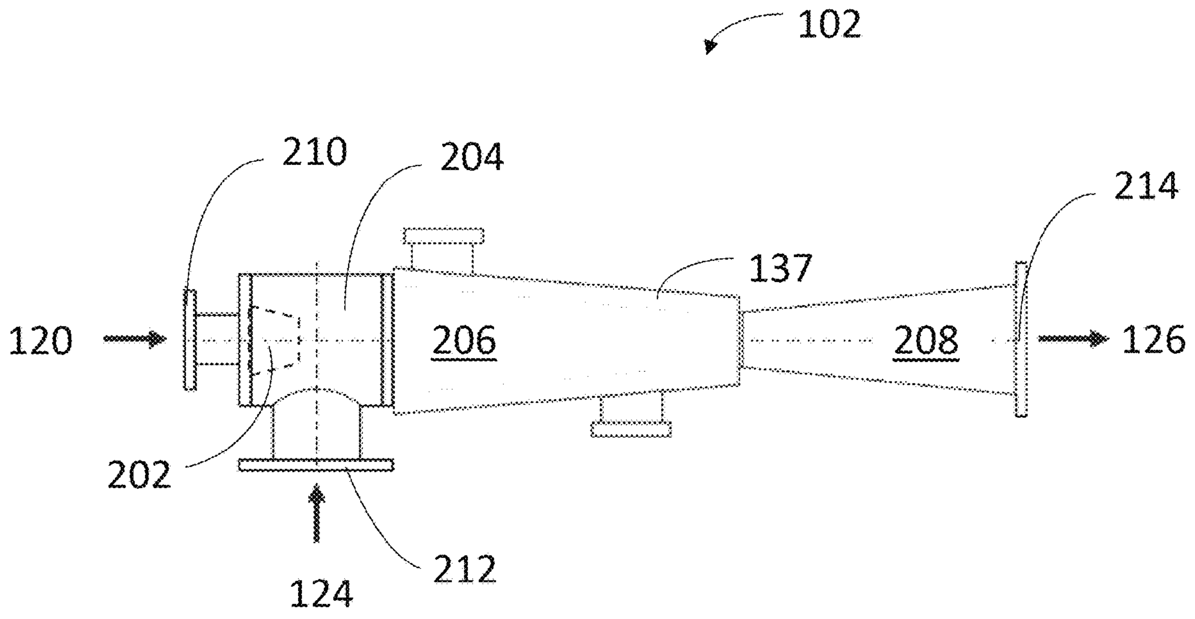
FIG. 2 is a schematic illustration of an ejector used for a PW degassing system.

FIG. 1 illustrates a PW degassing system 100. In various implementations, the PW degassing system 100 includes an ejector 102 fluidically coupled to a degassing vessel 104. The ejector 102 can be used to create a suction that can reduce an internal pressure of the degassing vessel 104. In various implementations, the degassing vessel can be maintained under vacuum or near-vacuum conditions. In some implementations, the internal pressure is kept at from about 1 kPa to about 10 kPa. In some implementations, the internal pressure inside the vessel can range, in a gauge pressure, from about 55 kPa to −83 kPa.

A PW stream 106 can provide multiple streams for different purposes such as the motive fluid, the feed solution for degassing, and injection water for enhanced oil recovery (EOR). In various implementations, the PW stream 106 contains at least one C1-C5 hydrocarbon, $CO_2$, $H_2S$, BTEX, or their combinations. For example, a composition of the PW stream 106 can include: 60 parts per million by weight (ppmw) C1-C5 hydrocarbons; 10 ppmw $CO_2$; 220 ppmw $H_2S$; and 10 ppmw BTEX. The target concentration for each gas in this example composition after the degassing can be: 0 ppmw C1-C5 hydrocarbons; <1 ppmw $CO_2$; <30 ppmw $H_2S$; and <1 ppmw BTEX.

As illustrated in FIG. 1, the PW stream 106 can be split, using a first splitter 108, into a first stream 110 and a second stream 112. The first stream 110 can be the source for a motive fluid and the second stream 112 can be the PW to be degassed. The split ratio of the first stream 110 to the second stream 112 can be determined based on the treatment capacity of the PW degassing system 100, the demand for clean water, and the demand for injection water for EOR, among others. In some implementations, the split ratio of the first stream 110 to the second stream 112 is from about 1:1 to about 1:50, e.g., about 3:50.

In various implementations, the first stream 110 is subsequently compressed using a compressor 114 to form a compressed PW stream 116. The compressed PW stream 116 can have a pressure at least 2000 psi (13.8 MPa), e.g., from about a pressure from about 2000 psi (13.8 MPa) to about 3000 psi (20.7 MPa). The compression of the first stream 110 can be performed such that the stream has a sufficiently high pressure to drive the ejector 102.

In some implementations, the compressed PW stream 116 is further split using a second splitter 118 into a motive fluid 120 and a remainder stream 122. In some implementations, the motive fluid 120 is flowed into the ejector 102 at a flow rate high enough to enable the degassing in the degassing vessel 104 as described below. The flow rate of the motive fluid 120 can be from about 100 $m^3$/day to about 600 $m^3$/day based on train capacity. In some implementations, the flow rate can be from about 200 $m^3$/day to about 600 $m^3$/day, about 300 $m^3$/day to about 600 $m^3$/day, about 400 $m^3$/day to about 600 $m^3$/day, about 500 $m^3$/day to about 600 $m^3$/day, about 100 $m^3$/day to about 500 $m^3$/day, about 100 $m^3$/day to about 400 $m^3$/day, about 100 $m^3$/day to about 300 $m^3$/day, about 100 $m^3$/day to about 200 $m^3$/day, or about 436 $m^3$/day.

While the motive fluid 120 can be fed to the ejector 102, the remainder stream 122 can be sent for another application. For example, the remainder stream 122 can be used as an injection water to be injected into a well for hydrocarbon production such as EOR. This integration with the purpose of injection water offers an advantage in simplifying the system and reducing the operational cost because the injection pumps in the existing infrastructure can be used as the compressor 114 to provide the high pressure required for the motive fluid 120 for the ejector 102. In some implementations, the ratio of the motive fluid 120 to the compressed PW stream 116 is from about 1:10 to about 1:50, e.g., 11:89 or 1:8.

In some implementations, acid injection is used to lower the feed sour water to below 4 to increase the stripping efficiency of $H_2S$ in the water. Lowering the pH prior to degassing can help maintain certain volatile gases, such as $H_2S$ and $CO_2$, in their undissociated molecular forms, improving the removal. For example, $H_2S$ remains predominantly as $H_2S$ molecules under acidic conditions, which are more volatile and easier to remove compared to the dissociated forms $HS^-$ or $S^{2-}$ that are favored at higher pH levels.

As further illustrated in FIG. 1, the second stream 112 can be sent to the degassing vessel 104 for degassing. The suction created by the ejector 102 can lower the internal pressure of the degassing vessel 104, and at least a portion of the dissolved gas in the second stream 112 is released from the second stream 112 as an off-gas 124. In various implementations, the off-gas 124 contains at least one C1-C5 hydrocarbon, $CO_2$, $H_2S$, BTEX, or their combinations. In some implementations, the reduction in pressure due to the suction is from about 70 psig (584.5 kPa) to around −12 psig (18.6 kPa).

The off-gas 124 can be introduced into the mixing zone of the ejector 102 to be mixed with the motive fluid 120, forming a mixed stream 126. In various implementations, the mixed stream 126 is a two-phase fluid system containing gas and liquid. In some implementations, the mixed stream 126 has a pressure from about 50 psi (344.7 kPa) to about 90 psi (620.5 kPa), e.g., about 70 psi (482.6 kPa).

The temperature of the mixed stream 126 can vary based on process condition upstream the degasser/ejector system. In various implementations, the temperature of the produced water used as a motive fluid is the same as the temperature of the produced water existing the GOSP.

A degassed PW stream 128 can be discharged from the degassing vessel 104 and sent to subsequent wastewater treatment systems. In various implementations, the subsequent treatments include filtration and desalination. Removing the dissolved gas from PW prior to these wastewater treatments can help minimizing the safety and environmental challenges in these processes due to flammable and toxic gases releasable from the stream. For example, the removal of C1-C5 hydrocarbons can minimize the issue of flammability and the removal of $H_2S$ can mitigate the corrosion and safety concerns. Accordingly, the use of the PW degassing system 100 of this disclosure can also eliminate some of the downstream equipment such as an $H_2S$ stripper and scrubber.

FIG. 1 illustrates one example configuration of the PW degassing system of this disclosure. In some implementations, alternative designs are used. For example, the PW degassing system can include multiple degassing vessels arranged in series or parallel to optimize gas removal efficiency or to target different types of dissolved gases separately. Additional variations in ejector design, vessel orientation, and piping layout can also be implemented.

Integration with Gas Oil Separation Plant (GOSP)

Still referring to FIG. 1, in some implementations, the PW degassing system 100 is integrated with a GOSP 130. GOSP is an upstream facility in oil and gas operations designed to separate the multiphase fluid produced from wells into its primary components: crude oil, natural gas, and water, e.g., PW. When hydrocarbons are extracted from a reservoir, they typically arrive as a mixture under high pressure containing oil, gas, water, and sometimes solids. In various implementations, a gas oil separation process can be performed to treat a hydrocarbon-water mixed stream 132, generating the PW stream 106. The GOSP 130 can uses a series of separators, heaters, and control systems to reduce pressure and allow gravity-based phase separation. In various implementations, gas is removed for processing or reinjection, oil is stabilized for export, and PW is routed for treatment by the PW degassing system 100. Since light hydrocarbons such as C1-C5 hydrocarbons can be still dissolved after the gas oil separation process at the GOSP 130, the PW degassing system 100 can remove such residual hydrocarbons dissolved in the PW stream 106 prior to sending it to subsequent wastewater treatment systems.

Further, in some implementations, the mixed stream 126 form the ejector 102 is sent back to the GOSP 130 for further hydrocarbon recovery. With this integration, the hydrocarbons released as the off-gas 124 can be treated at the GOSP and recovered, while eliminating or minimizing the waste discharge from the ejector 102.

As described above, in some implementations, the PW degassing system 100 can include: a GOSP 130 to generate a PW stream 106 containing a dissolved gas; a first splitter 108 fluidically downstream of the GOSP 130, configured to split the PW stream 106 into a first stream 110 and a second stream 112; a compressor 114 downstream of the first splitter 108, configured to compress the first stream 110; an ejector 102 downstream of the compressor 114, configured to receive a portion of the first stream 110 from the compressor 114 (as the motive fluid 120 in FIG. 1), at a motive inlet of the ejector 102, to create a suction; and a degassing vessel 104 downstream of the GOSP 130 and upstream of the ejector 102, configured to receive the second stream 112 and degas the second stream 112 using the suction, generating an off-gas 124. The off-gas 124 can be sent to a suction inlet of the ejector 102 and mixed with the motive fluid 120 in the ejector 102. In some implementations, as illustrated in FIG. 1, the outlet of the ejector 102 is fluidically connected to the GOSP 130 for feeding a mixed stream 126 (mixture of the motive fluid 120 and the off-gas 124) to the GOSP 130. Further, the compressor 114 can be or include an injection pump for injecting a remainder 122 of the first stream into a well.

Although the PW degassing system 100 is described as primarily intended for PW treatment, the concept described in this disclosure is not limited to this application. The same system can be adapted for other wastewater streams that contain dissolved gases or volatile components. Such a stream can be split to provide a motive fluid and a stream to be degassed. Additionally, in some implementations, other wastewater streams can be blended with PW prior to degassing to achieve combined treatment, offering flexibility for integrated water management in oil and gas facilities or other industrial operations Ejector System FIG. 2 is a schematic illustration of the design of the ejector 102 in accordance with some implementations. In FIG. 2, the ejector 102 has four distinct sections: a nozzle section 202, a suction chamber section 204, a compression section 206, and a diffuser section 208, for optimizing the compression and handling of the gases. In the nozzle section 202, the motive fluid 120, e.g., a portion of the compressed PW stream, enters the ejector 102 at a motive inlet 210. The off-gas 124, e.g., sent from the degassing vessel 104 in FIG. 1, can be introduced into the suction chamber section 204 through a suction inlet 212. Injecting the motive fluid 120 at a high pressure and velocity from the nozzle causes the off-gas 124 inside the chamber to be expelled from the degassing vessel 104 in FIG. 1 at a high velocity as well. The result of this process is that it creates an area of low pressure inside the system, creating a vacuum. The compression section 206 is where the actual compression of the mixture gas takes place. As illustrated in FIG. 2, in some implementations, it is optionally be surrounded by a heat exchange jacket, through which a heat exchanging fluid passes. The inner diameter of the chamber of the compression section can be narrowed along with the axial direction of the ejector 102. In the diffuser section 208, the mixed stream 126 can collected and discharged at an outlet 214.

Figure 3:
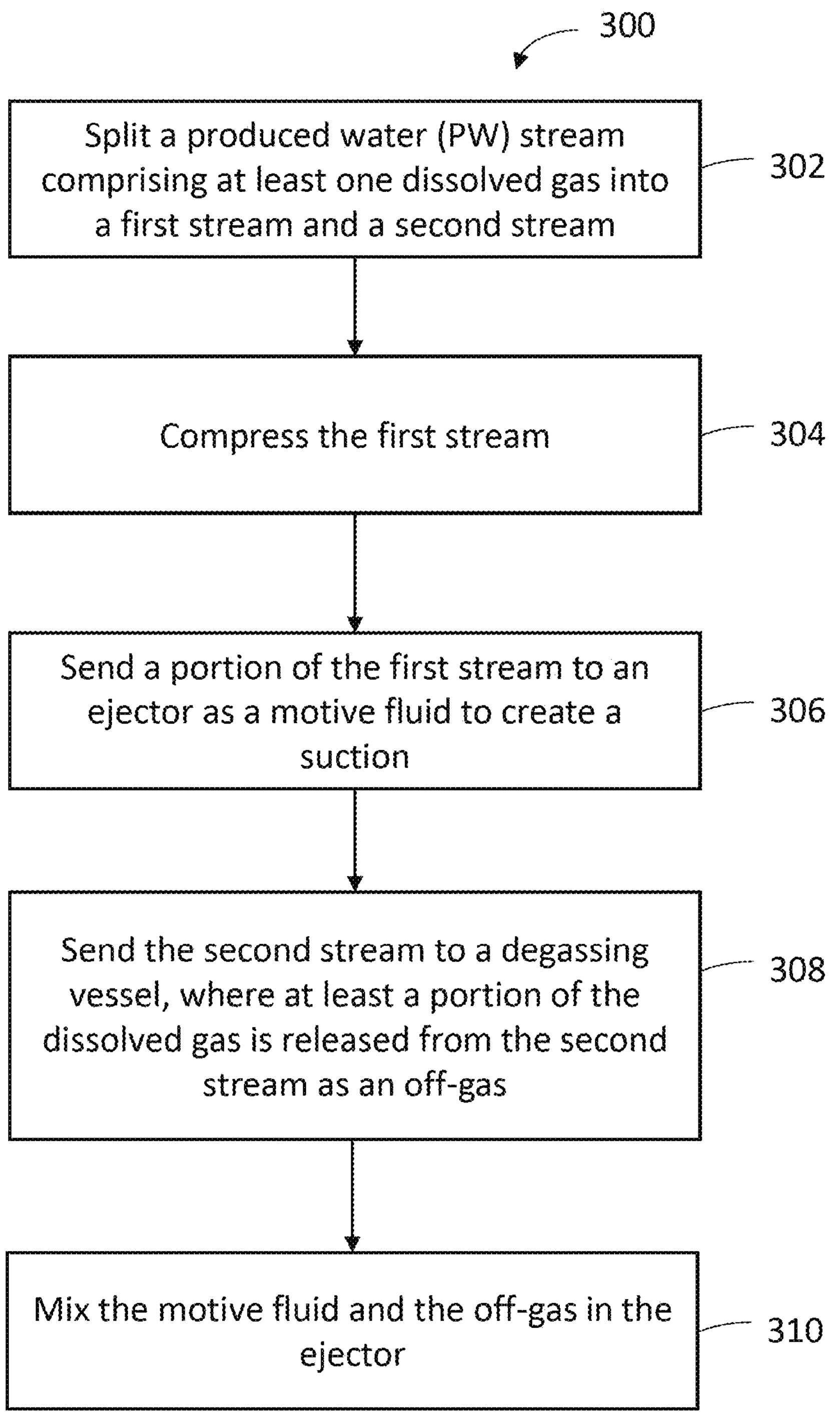
FIG. 3 is a process flow diagram of a method of PW degassing.

FIG. 3 is a process flow diagram of a method of treating a PW stream. A process 300 starts with step 302 of splitting the PW stream that contains a dissolved gas into a first stream and a second stream. At step 304, the first stream is compressed followed by step 306 of sending at least a portion of the first stream to an ejector as a motive fluid to create a suction. At step 308, the second stream is sent to a degassing vessel fluidically connected to the ejector, where the suction lowers an internal pressure of the degassing vessel, and at least a portion of the dissolved gas is released from the second stream as an off-gas. At step 310, the motive fluid and the off-gas are mixed in the ejector, forming a two-phase stream.

Figure 4:
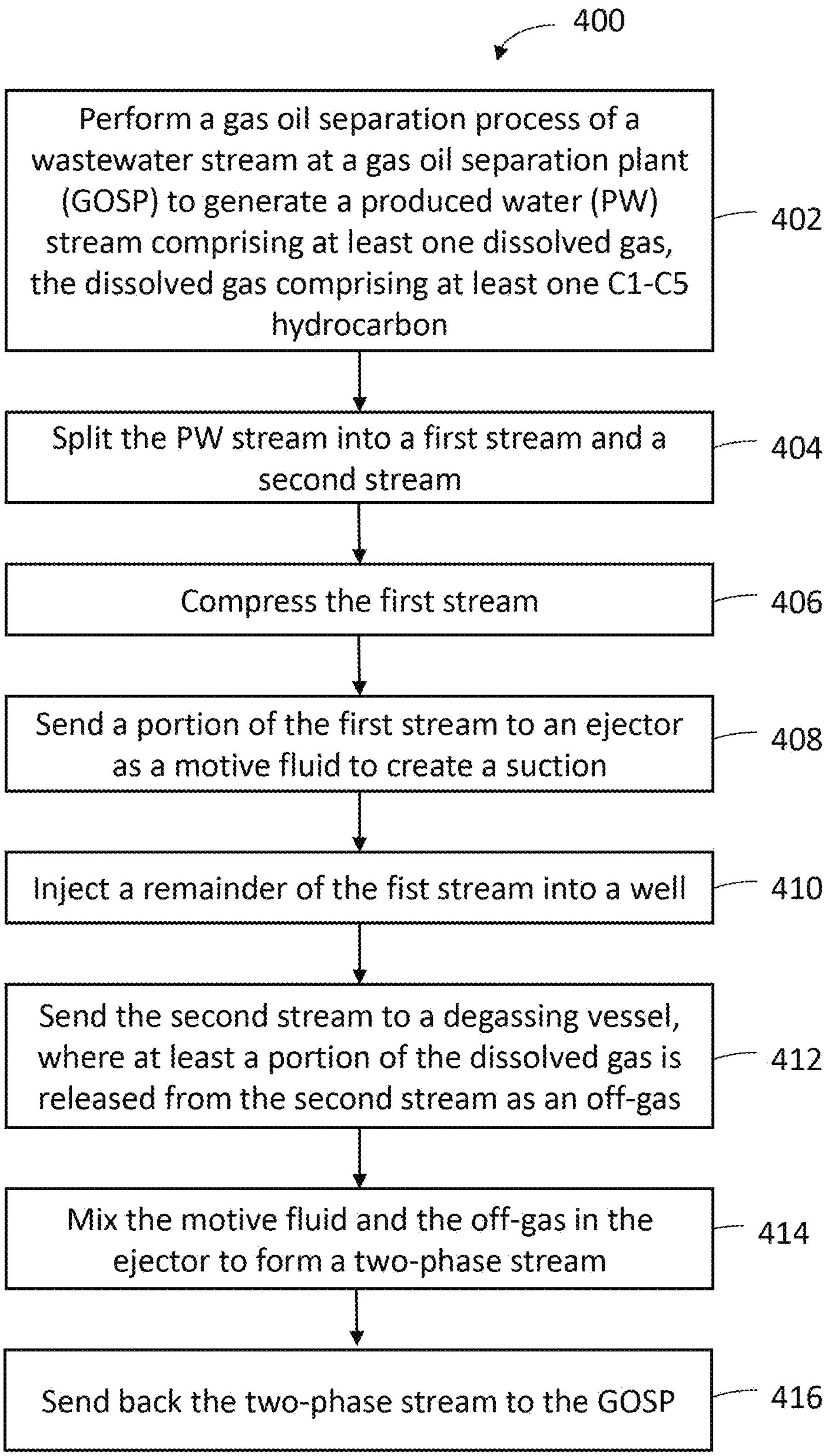
FIG. 4 is a process flow diagram of a method of PW degassing integrated with gas oil separation process.

FIG. 4 is another process flow diagram of a method of treating a PW stream, where the system integrates a GOSP. Process 400 starts with step 402 of performing a gas oil separation process of a hydrocarbon-water mixed stream at a GOSP to generate a PW stream including a dissolved gas. The dissolved gas contains at least one C1-C5 hydrocarbon. At step 404, the PW stream is split into a first stream and a second stream, followed by step 406 of compressing the first stream. After compressing the first stream, at step 408, at least a portion of the first stream is sent to an ejector as a motive fluid to create a suction. At step 410, a remainder of the first stream except the motive fluid is injected into a well. At step 412, the second stream is sent to a degassing vessel fluidically connected to the ejector. The suction lowers an internal pressure of the degassing vessel, and at least a portion of the C1-C5 hydrocarbons is released from the second stream as an off-gas. At step 414, the motive fluid and the off-gas are mixed in the ejector, forming a two-phase stream, followed by step 416 of sending back the two-phase stream to the GOSP for separating the at least a portion of the C1-C5 hydrocarbons.

The sequences of steps presented in the process flow charts of FIGS. 3-4 represent example implementations and can vary depending on specific operational requirements or experimental conditions. Certain steps can be rearranged, omitted, or supplemented with additional procedures without affecting the overall validity of the process.

As described above, various implementations of PW degassing can offer several advantages for overall water management and wastewater treatment processes. In particular, by removing dissolved gases from PW early at the initial stage, e.g., immediately after gas oil separation, the process significantly reduces corrosion risks in downstream equipment and piping, minimizing maintenance costs and extending asset life. It can also prevent issues such as scaling, pitting, and interference with chemical treatment or filtration systems, thereby improving the reliability and efficiency of subsequent water treatment steps. Additionally, early gas removal enhances safety by reducing the presence of toxic and flammable gases in later stages, simplifying system design and potentially lowering the need for hazardous area classifications.

Further, the degassing is driven by the suction created in the ejector system using a portion of the PW itself as a motive fluid. Therefore, there is no need of a new source for water to provide the high-pressure stream. It can be obtained from the existing facilities such as injection pump to compress the PW stream. In addition, in some implementations, the ejector system can be made without moving parts, making the process easier with minimal maintenance requirements.

Another advantage of the PW degassing of this disclosure is the ability to eliminate or mitigate the need for electrical and hazardous area classification. Such classification involves identifying and defining zones where fire or explosion hazards may exist due to the presence of flammable gases, vapors, or mists—typically requiring specialized equipment installation under frameworks such as International Electrotechnical Commission System for Certification to Standards Relating to Equipment for Use in Explosive Atmospheres (IECEx System) and ATmosphères EXplosibles (ATEX). By removing dissolved gases from the process stream, the risk of forming explosive mixtures is mitigated, thereby reducing the extent of classified zones. This also contributes to eliminating the need for flaring, resulting in lower overall operational costs.

Implementations

An implementation described in this disclosure provides a method of treating a PW stream including a dissolved gas. The method includes splitting the PW stream into a first stream and a second stream. The method further includes compressing the first stream, followed by sending at least a portion of the first stream to an ejector as a motive fluid to create a suction. The method further includes sending the second stream to a degassing vessel fluidically connected to the ejector, where the suction lowers an internal pressure of the degassing vessel, and at least a portion of the dissolved gas is released from the second stream as an off-gas. The method further includes mixing the motive fluid and the off-gas in the ejector, forming a two-phase stream.

In an aspect, the method further includes performing a gas oil separation process of a hydrocarbon-water mixed stream, generating the PW stream.

In an aspect, combinable with any other aspect, the method further includes, after compressing the first stream, injecting a remainder of the first stream except the motive fluid into a well.

In an aspect, combinable with any other aspect, the method further includes ejecting a treated PW stream from the degassing vessel; and sending the treated PW stream to a downstream water treatment facility.

In an aspect, combinable with any other aspect, the method further includes sending the two-phase stream to a gas oil separation plant (GOSP).

In an aspect, the PW stream is generated by treating a hydrocarbon-water mixed stream at the GOSP.

In an aspect, combinable with any other aspect, the dissolved gas includes at least one C1-C5 hydrocarbon.

In an aspect, combinable with any other aspect, the dissolved gas includes carbon dioxide ($CO_2$).

In an aspect, combinable with any other aspect, the dissolved gas includes hydrogen sulfide ($H_2S$).

In an aspect, combinable with any other aspect, the dissolved gas includes benzene, toluene, ethylbenzene, or xylene.

In an aspect, combinable with any other aspect, a split ratio of the first stream to the second stream is from 1:1 to 1:50.

In an aspect, combinable with any other aspect, a ratio of the motive fluid to the first stream is from 1:10 to 1:50.

Another implementation described in this disclosure provides a method of treating a produced water (PW) stream. The method includes performing a gas oil separation process of a hydrocarbon-water mixed stream at a gas oil separation plant (GOSP) to generate a PW stream including a dissolved gas, the dissolved gas including at least one C1-C5 hydrocarbon. The method further includes splitting the PW stream into a first stream and a second stream; compressing the first stream; after compressing the first stream, sending a portion of the first stream to an ejector as a motive fluid to create a suction; after compressing the first stream, injecting a remainder of the first stream except the motive fluid into a well; sending the second stream to a degassing vessel fluidically connected to the ejector, wherein the suction lowers an internal pressure of the degassing vessel, and at least a portion of the C1-C5 hydrocarbons is released from the second stream as an off-gas; mixing the motive fluid and the off-gas in the ejector, forming a two-phase stream; and sending back the two-phase stream to the GOSP.

In an aspect, the method further includes mixing the two-phase stream with a feed solution to the GOSP.

In an aspect, the dissolved gas further includes carbon dioxide ($CO_2$) and hydrogen sulfide ($H_2S$).

In an aspect, combinable with any other aspect, the motive fluid has a pressure from 2000 psi (13.8 MPa) to 3000 psi (20.7 MPa).

In an aspect, combinable with any other aspect, the ejector creates a suction pressure from 1 kPa to 10 kPa.

Another implementation described in this disclosure provides a system for treating a produced water (PW) stream. The system includes a gas oil separation plant (GOSP) to generate a PW stream including a dissolved gas. The system further includes a splitter fluidically downstream of the GOSP, configured to split the PW stream into a first stream and a second stream. The system further includes a compressor downstream of the splitter, configured to compress the first stream. The system further includes an ejector downstream of the compressor, configured to receive a portion of the first stream from the compressor, at a motive inlet of the ejector, as a motive fluid to create a suction. The system further includes a degassing vessel downstream of the GOSP and upstream of the ejector, configured to receive the second stream and degas the second stream using the suction, generating an off-gas, wherein the off-gas is sent to a suction inlet of the ejector and mixed with the motive fluid in the ejector.

In an aspect, a mixed stream including the motive fluid and the off-gas is ejected from an outlet of the ejector, and the outlet is fluidically connected to the GOSP for feeding the mixed stream to the GOSP.

In an aspect, combinable with any other aspect, the compressor includes an injection pump for injecting a remainder of the first stream into a well.

While this invention has been described with reference to illustrative implementations, this description is not intended to be construed in a limiting sense. Various modifications and combinations of the illustrative implementations, as well as other implementations of the invention, will be apparent to persons skilled in the art upon reference to the description. It is therefore intended that the appended claims encompass any such modifications or implementations.

What is claimed is:

1. A method of treating a produced water (PW) stream, the method comprising:

splitting a PW stream comprising a dissolved gas into a first stream and a second stream;

compressing the first stream;

after compressing the first stream, sending a portion of the first stream to an ejector as a motive fluid to create a suction;

sending the second stream to a degassing vessel fluidically connected to the ejector, wherein the suction lowers an internal pressure of the degassing vessel, and at least a portion of the dissolved gas is released from the second stream as an off-gas; and mixing the motive fluid and the off-gas in the ejector, forming a two-phase stream.

2. The method of claim 1, further comprising performing a gas oil separation process of a hydrocarbon-water mixed stream, generating the PW stream.

3. The method of claim 1, further comprising, after compressing the first stream, injecting a remainder of the first stream except the motive fluid into a well.

4. The method of claim 1, further comprising:

ejecting a treated PW stream from the degassing vessel; and sending the treated PW stream to a downstream water treatment facility.

5. The method of claim 1, further comprising sending the two-phase stream to a gas oil separation plant (GOSP).

6. The method of claim 5, wherein the PW stream is generated by treating a hydrocarbon-water mixed stream at the GOSP.

7. The method of claim 1, wherein the dissolved gas comprises at least one C1-C5 hydrocarbon.

8. The method of claim 1, wherein the dissolved gas comprises carbon dioxide ($CO_2$).

9. The method of claim 1, wherein the dissolved gas comprises hydrogen sulfide ($H_2S$).

10. The method of claim 1, wherein the dissolved gas comprises benzene, toluene, ethylbenzene, or xylene.

11. The method of claim 1, wherein a split ratio of the first stream to the second stream is from 1:1 to 1:50.

12. The method of claim 1, wherein a ratio of the motive fluid to the first stream is from 1:10 to 1:50.

13. A method of treating a produced water (PW) stream, the method comprising:

performing a gas oil separation process of a hydrocarbon-water mixed stream at a gas oil separation plant (GOSP) to generate a PW stream comprising a dissolved gas, the dissolved gas comprising at least one C1-C5 hydrocarbon;

splitting the PW stream into a first stream and a second stream;

compressing the first stream;

after compressing the first stream, sending a portion of the first stream to an ejector as a motive fluid to create a suction;

after compressing the first stream, injecting a remainder of the first stream except the motive fluid into a well;

sending the second stream to a degassing vessel fluidically connected to the ejector, wherein the suction lowers an internal pressure of the degassing vessel, and at least a portion of the C1-C5 hydrocarbons is released from the second stream as an off-gas;

mixing the motive fluid and the off-gas in the ejector, forming a two-phase stream; and sending back the two-phase stream to the GOSP.

14. The method of claim 13, further comprising mixing the two-phase stream with a feed solution to the GOSP.

15. The method of claim 13, wherein the dissolved gas further comprises carbon dioxide ($CO_2$) and hydrogen sulfide ($H_2S$).

16. The method of claim 13, wherein the motive fluid has a pressure from 2000 psi (13.8 MPa) to 3000 psi (20.7 MPa).

17. The method of claim 13, wherein the ejector creates a suction pressure from 1 kPa to 10 kPa.

18. A system for treating a produced water (PW) stream, the system comprising:

a gas oil separation plant (GOSP) to generate a PW stream comprising a dissolved gas;

a splitter fluidically downstream of the GOSP, configured to split the PW stream into a first stream and a second stream;

a compressor downstream of the splitter, configured to compress the first stream;

an ejector downstream of the compressor, configured to receive a portion of the first stream from the compressor, at a motive inlet of the ejector, as a motive fluid to create a suction; and a degassing vessel downstream of the GOSP and upstream of the ejector, configured to receive the second stream and degas the second stream using the suction, generating an off-gas, wherein the off-gas is sent to a suction inlet of the ejector and mixed with the motive fluid in the ejector.

19. The system of claim 18, wherein a mixed stream comprising the motive fluid and the off-gas is ejected from an outlet of the ejector, and the outlet is fluidically connected to the GOSP for feeding the mixed stream to the GOSP.

20. The system of claim 18, wherein the compressor comprises an injection pump for injecting a remainder of the first stream into a well.

* * * * *